United States Patent
Ledvina et al.

(10) Patent No.: US 10,187,919 B2
(45) Date of Patent: Jan. 22, 2019

(54) PROXIMITY PAIRING BASED ON SIGNAL STRENGTH

(71) Applicant: Apple Inc., Cupertino, CA (US)

(72) Inventors: Brent M. Ledvina, San Francisco, CA (US); Robert William Mayor, Half Moon Bay, CA (US); Bob Bradley, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/686,083

(22) Filed: Aug. 24, 2017

(65) Prior Publication Data

US 2018/0338330 A1 Nov. 22, 2018

Related U.S. Application Data

(60) Provisional application No. 62/509,649, filed on May 22, 2017.

(51) Int. Cl.
*H04B 7/00* (2006.01)
*H04W 76/14* (2018.01)
*H04W 8/00* (2009.01)
*H04W 24/10* (2009.01)
(Continued)

(52) U.S. Cl.
CPC ............ *H04W 76/14* (2018.02); *H04W 4/80* (2018.02); *H04W 8/005* (2013.01); *H04W 24/10* (2013.01); *H04W 12/06* (2013.01)

(58) Field of Classification Search
CPC ... H04W 76/021; H04W 8/005; H04W 12/06; H04W 4/008
See application file for complete search history.

(56) References Cited

U.S. PATENT DOCUMENTS 8,880,051 B2 11/2014 Ghosh et al.
2016/0256741 A1* 9/2016 Holma ................ G06F 19/3481
2016/0278137 A1 9/2016 Oguchi
(Continued)

OTHER PUBLICATIONS

Mathur, Suhas et al., "ProxiMate: Proximity-based Secure Pairing using Ambient Wireless Signals." MobiSys'11, Jun. 28-Jul. 1, 2011, Bethesda, Maryland, USA. Copyright 2011 ACM 978- 1-14503- 0643-01/11/06. 14 pp.
(Continued)

*Primary Examiner* — Tuan Pham
(74) *Attorney, Agent, or Firm* — Kilpatrick Townsend and Stockton LLP

(57) ABSTRACT

Proximity of a responder device to an initiator device can be used to determine user intent for pairing the responder device with the initiator device. For example, the initiator device can measure a signal strength of an advertisement signal from the responder device. When the signal strength is sufficiently strong, a pairing process can be initiated, e.g., the user of the initiator device can automatically be prompted to begin pairing. The determination of whether the signal strength is sufficiently high can be determined based on a human interaction model, which can use measurements from various geometrical configurations of the two types of devices. Measurements at expected configurations that users would place the two devices to initiate pairing can be used to determine a threshold value for the signal strength to identify user intent with a new pair of devices.

21 Claims, 13 Drawing Sheets

(51) Int. Cl.
*H04W 4/80* (2018.01)
*H04W 12/06* (2009.01)

(56) References Cited

U.S. PATENT DOCUMENTS

| | | | |
|---|---|---|---|
| 2017/0013547 A1 | 1/2017 | Skaaksrud et al. | |
| 2017/0038787 A1 | 2/2017 | Baker et al. | |
| 2017/0039833 A1 | 2/2017 | Baczuk et al. | |
| 2017/0171699 A1* | 6/2017 | Jin | H04W 4/02 |
| 2017/0214780 A1* | 7/2017 | Gofman | H04W 76/10 |

OTHER PUBLICATIONS

Varshavsky, Alex et al., "Amigo: Proximity-Based Authentication of Mobile Devices." J. Krumm et al. (Eds.): UbiComp 2007, LNCS 4717, pp. 253-270. © Springer-Verlag Berlin Heidelberg 2007. 18 pp.

* cited by examiner

| Field Sub-define | Code (1 Byte) | IO Cap (1 Byte) | OOB DF (1 Byte) | AuthReq (1 Byte) | | | | Maximum Encryption Key Size (1 Byte) | Initiator Key Distribution (1 Byte) | Responder Key Distribution (1 Byte) |
|---|---|---|---|---|---|---|---|---|---|---|
| | | | | BF | MITM | SC | KP | Reserved | | | |
| Bits* | 8 | 8 | 8 | 2 | 1 | 1 | 1 | 3 | 8 | 8 | 8 |

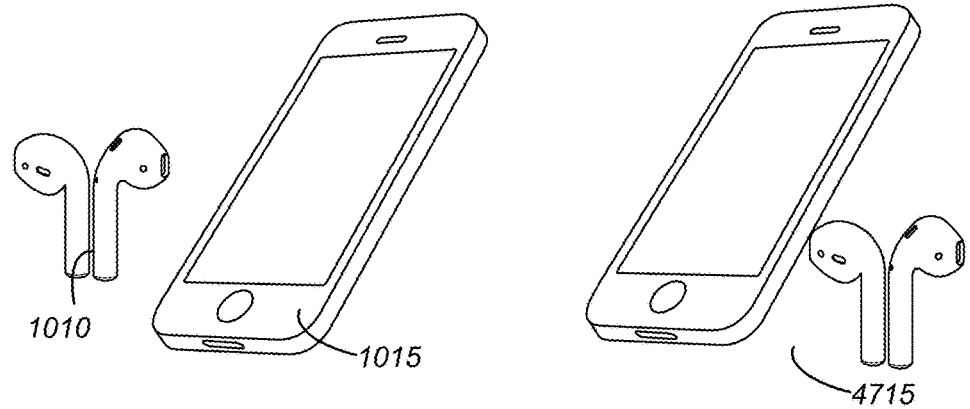
FIG. 10A  FIG. 10B
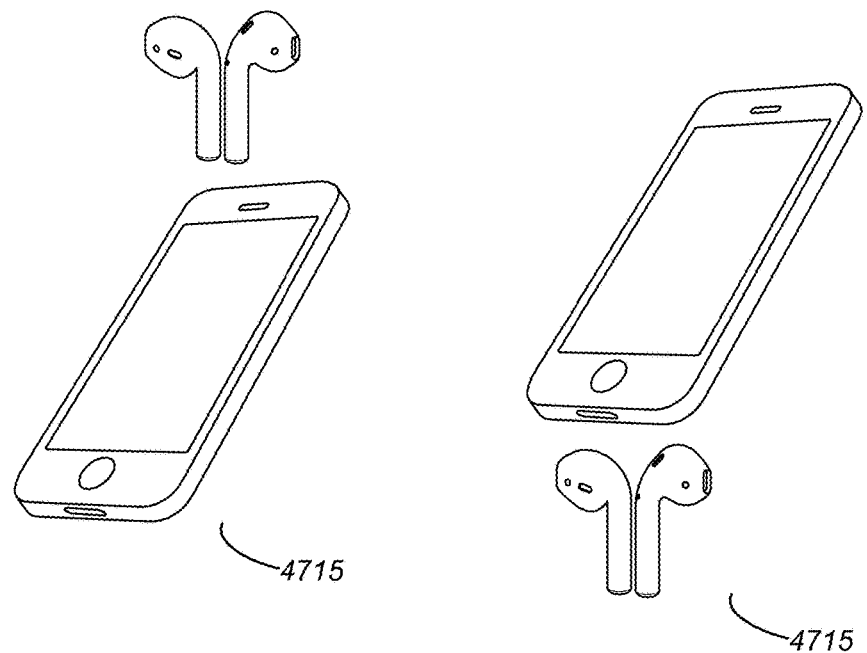
FIG. 10C  FIG. 10D

PROXIMITY PAIRING BASED ON SIGNAL STRENGTH

CROSS-REFERENCES TO RELATED APPLICATIONS

The present application claims priority from and is a nonprovisional application of U.S. Provisional Application No. 62/509,649, entitled "Proximity Pairing Based on Signal Strength" filed May 22, 2017, the entire contents of which are herein incorporated by reference for all purposes.

BACKGROUND

Typically, in Bluetooth®, pairing two devices requires a user to push a pairing button on the slave device and then navigate to a settings page on the master device to identify the accessory device. The user can then select an option on the master device to connect to the slave device. Although such a process can be relatively easy, it is desirable to provide simpler techniques that require less user interaction.

BRIEF SUMMARY

Embodiments are directed to using proximity of a responder device (e.g., a slave) to an initiator device (e.g., a master device) to determine user intent for pairing the responder device with the initiator device. For example, the initiator device can measure a signal strength of an advertisement signal from the responder device. When the signal strength is sufficiently strong, a pairing process can be initiated, e.g., the user of the initiator device can automatically be prompted to begin pairing. The determination of whether the signal strength is sufficiently high can be determined based on a human interaction model, which can use measurements from various geometrical configurations of the two types of devices. Measurements at expected configurations that users would place the two devices to initiate pairing can be used to determine a threshold value for the signal strength to identify user intent with a new pair of devices. The responder device can include multiple sub-units, e.g., two headphones.

Other embodiments are directed to systems, portable consumer devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 shows the fields of an example pairing request/response according to embodiments of the present invention.

FIGS. 10A-10D show different configurations of a particular pair of devices that are in proximal states according to embodiments of the present invention.

DETAILED DESCRIPTION

Figure 1:
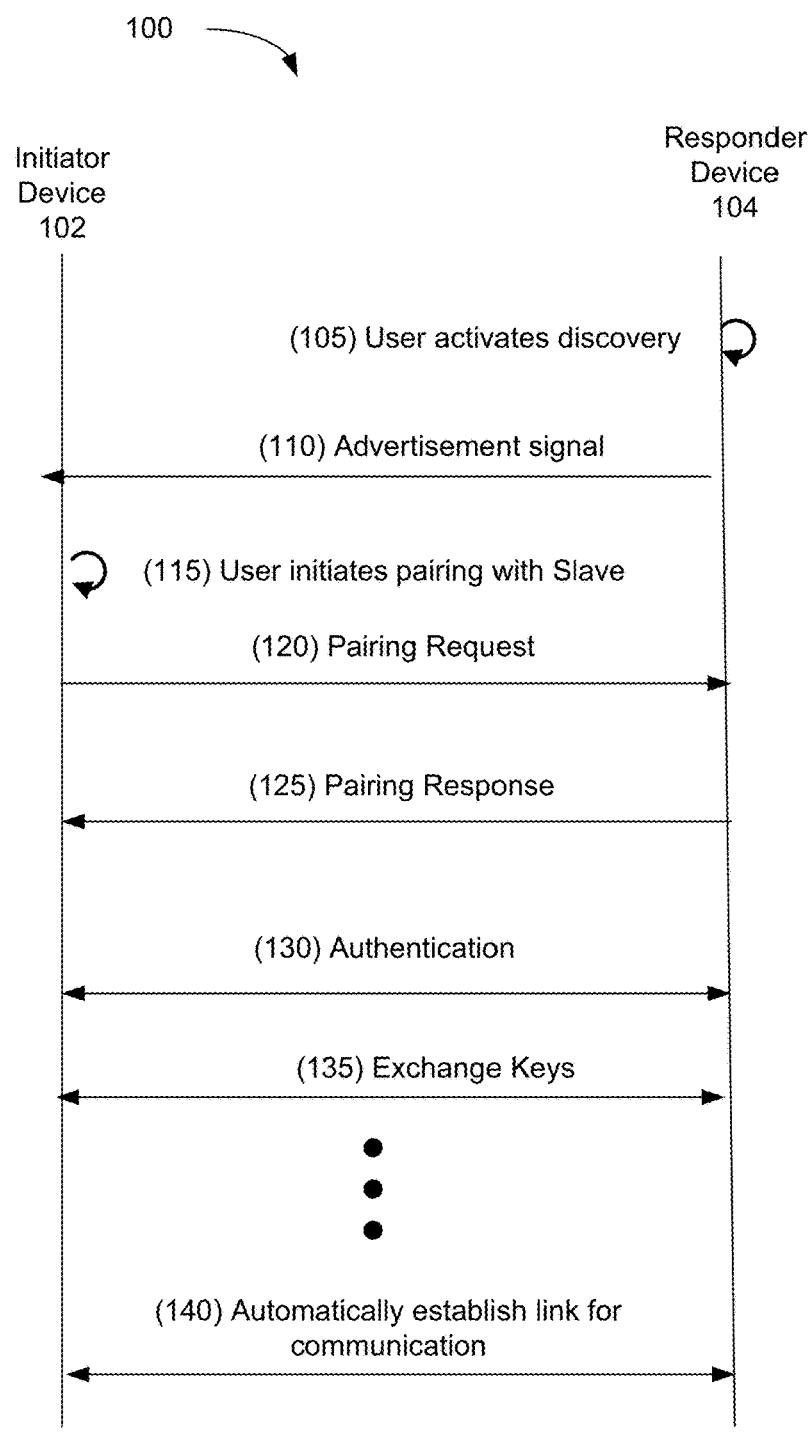
FIG. 1 shows a sequence diagram of a pairing process that may be improved.

To provide a more convenient user experience, embodiments can initiate a pairing process between two devices when the two devices are brought close to each other (i.e., in a proximal state). The two devices can have particular roles of an initiator device and a responder device. The initiator device can detect an advertisement signal from the responder device, which may emit a particular advertisement signal under certain conditions. The initiator device can measure the signal strength of the advertisement signal and determine whether the two devices are proximal to each other based on the signal strength. The classification of the two devices as being proximal or non-proximal can be determined based on a human interaction (HI) model, which can be generated based on measurements at various configurations between the devices. Each configuration can be labeled as proximal or non-proximal based on observations of user expectations. For example, after a user is instructed to place the two devices close to each other, the actual placement of the two devices relative to each other can be observed. In this manner, the HI model can be trained to predict the classification based on user expectation.

This disclosure describes a pairing process (e.g., as may occur in Bluetooth®) and the use of proximity in the pairing process. Examples of different types of responder devices and elements of the advertisement signal are provided, as well as further details about the HI model. Certain functionality may occur automatically based on information in the advertisement signals (e.g., when a device is new). For example, the initiator device can prompt a user about whether settings are to be transferred to/from the responder device.

I. Pairing

Pairing is how two devices (e.g., a phone and a headset) associate themselves with one another to create a connection (e.g., a Bluetooth® connection). Once pairing has occurred, two devices may communicate with each other. Pairing is generally initiated manually by a user, e.g., by selecting a discovered device on a settings page of the initiator device. The initiator device can then transmit a pairing request to a responder device with which it is not yet paired. Pairing usually occurs one time between two devices. After pairing, connections between the two devices are authenticated automatically.

For pairing to proceed, a password or "Passkey" can be exchanged between the two devices for authentication. The Passkey is used to ensure that both devices have agreed to pair with each other. When two devices are paired, the devices can be sure about the identity of the other device. To complete the pairing, the two devices generate a shared secret key(s) that are used for all future communication between the devices.

For Bluetooth® (BT) low energy, the Security Manager Protocol (SMP) carries out the pairing in three phases. In phase 1, the two devices announce their input and output capabilities, which are used to determine a suitable method for phase 2. In phase 2, the two devices authenticate each other and determine the key generation method for keys used in phase 3. More specifically, in phase 2, the two devices use the IO capabilities from the pairing request and pairing response packet in phase 1 to determine which authentication method to use. Four authentication techniques are typically available: Just Works™, Numeric Comparison, Passkey, and Out of band (OOB). In phase 3, each device may distribute to the other device one or more keys for future communication. Example keys include: (a) a Long Term Key (LTK) used to generate the session key for an encrypted connection, (b) a Connection Signature Resolving Key (CSRK) used to sign data and verify signatures, and (c) an Identity Resolving Key (IRK) used to generate a private address. In Bluetooth® 4.2 devices, the LTK is exchanged/generated using Elliptic Curve Diffie Hellman (ECDH) public key cryptography.

In Just Works™, the devices exchange their public keys. Then, the responder device generates a nonce (e.g., a random seed value) and uses the nonce and both public keys to generate a confirmation value Cb. The responder device then sends the Cb along with the nonce to the initiator device. The initiator device then uses the responder device's nonce (along with both public keys) to generate its own confirmation value Ca, which should match Cb. If the confirmation values match, then the connection proceeds. The initiator device can generate its own nonce and send it to the responder device, which can perform its own verification.

Numeric Comparison follows the same procedure as Just Works™, but adds another step at the end. Once the two devices confirm that the confirmation values match, both devices independently generate a final 6 digit confirmation value using both of the nonces. The devices both display their calculated values to the user. The user then manually checks that both values match and confirms the connection. This extra step allows this pairing method to provide protection from man-in-the-middle (MITM) attacks.

In Passkey, a 6 digit number is input into one or both of the devices. The two devices use the passkey, public keys previously exchanged, and a nonce to authenticate the connection. This process can be done bit by bit for every bit of the passkey. For example, one device will compute a confirmation value for one bit of the passkey and reveal it to the other device. The other device will then compute its own confirmation value for the first bit of its passkey and reveal it to the first device. This process continues until all the bits of the passkey has been exchanged and verified to match. This passkey method is resilient to MITM attacks.

Out of band (OOB) uses an external means of communication, such as Near Field Communication (NFC) to exchange some information (e.g., the public keys, nonces and confirmation values) used in the pairing process. Pairing is completed using the Bluetooth® radio, but requires information from the OOB mechanism. This provides only the level of MITM protection that is present in the OOB mechanism.

FIG. 1 shows a sequence diagram of a pairing process 100 that may be improved. Pairing process involves an initiator device 102 and a responder device 104. Each device determines its capability for input and output (IO). For each device in a paring link, the IO capability determines their ability to create encryption shared secret keys. Public key cryptography can be used.

In step 105, a user activates a discovery mode on responder device 104. To be found by other Bluetooth devices, a device should be set to discoverable mode so that an advertisement signal is sent. The advertisement signal allows other devices in the vicinity to detect its presence and attempt to establish a connection. For example, a user can activate a button on responder device 104. In some embodiments, this can be done by a user opening a case that contains the responder device (e.g., headphones), as described in U.S. Patent Publication No. 2017/0013342.

In step 110, responder device 104 emits an advertisement signal in response to the user activation. Initiator device 102 can detect the advertisement signal. For example, initiator device 102 can periodically scan for advertisement signals. A user can enable initiator device 102 to perform such scans and set a scan rate, or a scan rate can be set by default. The advertisement signal can include an identifier of the type of device (e.g., phone, headset, etc.), a device name (e.g., allocated by user or manufacturer), and the like.

In step 115, the user initiates a pairing process by providing user input at a user interface of responder device 104. For example, the user can navigate to a settings page, determine that responder device 104 has been detected via the advertisement signal, and select an option to pair with responder device 104.

In step 120, a Pairing Request message is sent from initiator device 102 to responder device 104. As examples, the Pairing Request message can include IO capabilities of initiator device 102, authentication data availability, authentication requirements, key size requirements, and other data.

In step 125, a Pairing Response message is transmitted from responder device 104 and contains much of the same information as the Pairing Request message. Steps 120 and 125 can occur as part of phase 1. The devices can use the information in the messages to perform authentication, e.g., to select an authentication option and implement authentication.

In step 130, authentication is performed, e.g., via one of the four modes discussed above. The authentication can establish that a device is communicating with another device corresponding to the encryption keys being used. Authentication can be confirmed by one device or both devices. Authentication can be performed as phase 2.

In step 135, keys are exchanged, e.g., as part of phase 3. The exchange of keys can correspond to a bonding process so that pairing (e.g., phases 1 and 2) do not have to be performed each time the devices connect (link) to each other.

Thus, the keys can be used to encrypt future communications. For example, an advertisement signal can identify the responder device, and the initiator device can determine that the two devices have already been paired. The initiator device can then proceed to use one or more keys to send a message to the responder device, which can use its stored keys to decrypt or otherwise read the message.

In step 140, at a later time, a link for communication is automatically established between the devices. As just explained, this link can use the exchanged keys. And, since the devices have already been paired, messages can immediately be sent across the link, once an advertisement signal has been detected. But, this automatic connection requires that a pairing process has already been performed. A device can determine that the other device has already been paired by comparing data in the advertisement signal to a list of devices that have already been paired.

II. Initiating Pairing Based on Proximity

In FIG. 1, the user needs to activate the discovery mode on the responder device. The user also needs to navigate to a particular settings page for selecting the responder device to initiate pairing on the initiator device. Such a navigation process can take multiple screens to reach the option for selecting the responder device. Embodiments can streamline this process. For example, the initiator device can estimate whether the responder device is close (proximal) or far away (non-proximal) from the initiator device based on a strength of the signal emitted from the responder device. This proximity analysis can be used instead of requiring the user to navigate to a particular settings page. The user can still be required to confirm the pairing (e.g., via a button displayed on a lock screen), but the button can be proactively provided on the initiator device when the responder device is detected to be close. The displaying of the confirmation option can be part of initiating a pairing process. Such a process can provide a more convenient pairing process to a user of the initiator device.

A. Inferring User Intent Based on Signal Strength

User intent to pair the two devices can be explicitly determined from user input at an initiator device, e.g., selecting a button after navigating to particular settings page. But, as described above, it is desirable to provide techniques that require less interaction. Instead, user intent to pair the devices can be inferred from the user bringing two devices within close proximity to each other. The user can be instructed to perform such an action at a time when the responder device is emitting an advertisement signal, so that the strength of the advertisement signal can be measured and determined to be sufficiently high, thereby identifying user intent. The instructions can be provided with the packaging when the responder device is bought. As another example, instructions could also be provided on screen for certain applications, such as setting up a new phone.

For example, when a responder device (e.g., headphones) is close to a phone, the phone can perform one or more measurements to determine whether the user has the intent to pair the responder device with the phone. Intent can be inferred when the devices are very close, e.g., at a distance that would not occur inadvertently. Such a close distance can be contrasted with a distance that might occur for a device of another person sitting next to the user. In the latter example, the phone should not identify user intent to pair the two devices. Intent can be further confirmed based on a signal strength increasing and/or longevity of the signal indicating proximity.

B. Proximal and Non Proximal States

As described above, signal strength can be used as a proxy for determining whether two devices are proximal or non-proximal, which a pairing process can be initiated when a proximal state is detected. To determine which signal strengths correspond to proximal and non-proximal states, one can classify a first set of configurations (distances) of the two devices as corresponding to proximal states and classify a second set of configurations as corresponding to non-proximal states. The distinction between proximal and non-proximal states can allow for an initiator device to identify user intent for initiating the pairing process.

Figure 2B:
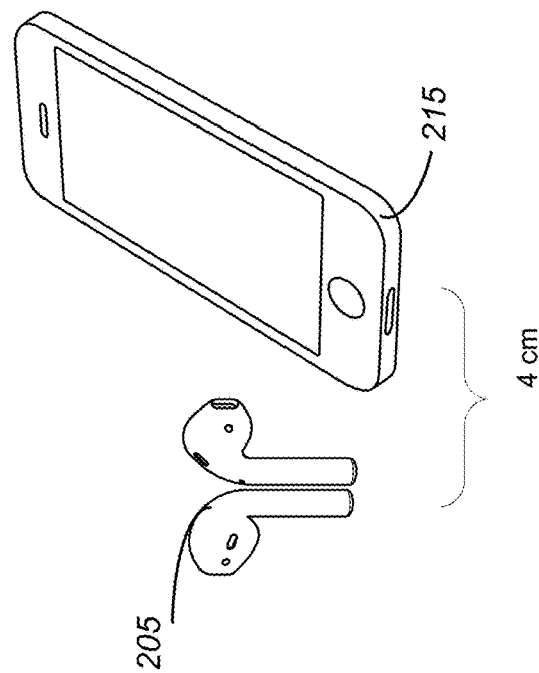
FIGS. 2A and 2B shows two configurations corresponding to proximal states of an initiator device and a responder device according to embodiments of the present invention.
Figure 2A:
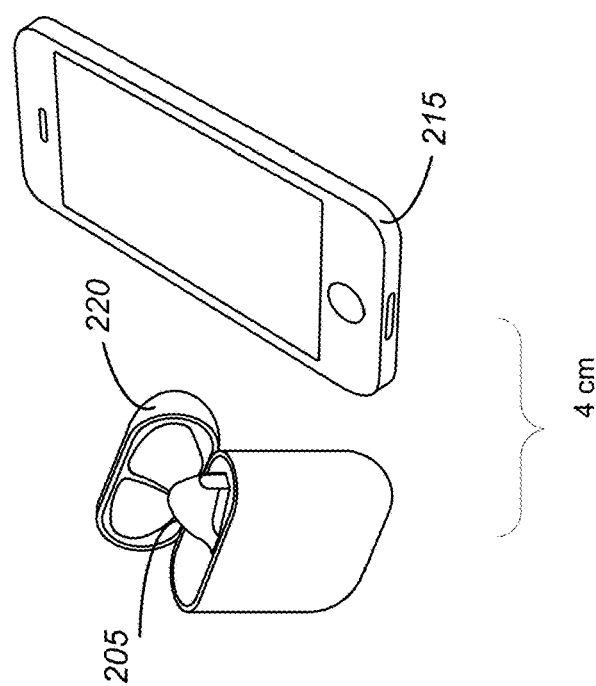

One or more criteria can be defined to label the two types of configuration states. The labeling of a configuration allows a determination of which signal strengths correspond to a proximal state and which signal strengths correspond to a non-proximal state. For example, a particular distance between the two devices can be used as a criterion for labeling whether a particular configuration of the two devices corresponds to a proximal state or a non-proximal state. FIGS. 2A and 2B provide examples of different configurations corresponding to a proximal state or a non-proximal state.

Such classification can be established based on expected configurations that a user would place the two devices when instructed to bring them close. For example, the configurations of the devices corresponding to the two states can be determined based on typical usage of users. Thus, the expectations of what a user would consider near can be used to classify whether a status is proximal or non-proximal. Various configurations can thus be labeled and measurements taken at the various configurations.

FIGS. 2A and 2B shows two configurations corresponding to proximal states of an initiator device and a responder device according to embodiments of the present invention. The initiator device is shown as a phone 215, and the responder device is shown as headphones 205. In FIG. 2A, headphones 205 are shown inside a case 220, whereas FIG. 2B shows headphones 205 outside of case 220. The approximate distance between the two devices is 4 cm in the example shown. Other distances can correspond to the typical distance for proximal states, e.g., 2 cm or 3 cm.

The one or more criteria for a proximal state can differ depending on the types of two devices, e.g., based on their physical shape and size of an outer housing, as well as properties of the antennas themselves (e.g., location of the antenna in a device). In various embodiments of proximal states, the two devices can be physically touching, the responder device just in front of the initiator device, the responder device just behind the initiator device, or similar configurations with the devices being above or below each other.

Figure 3:
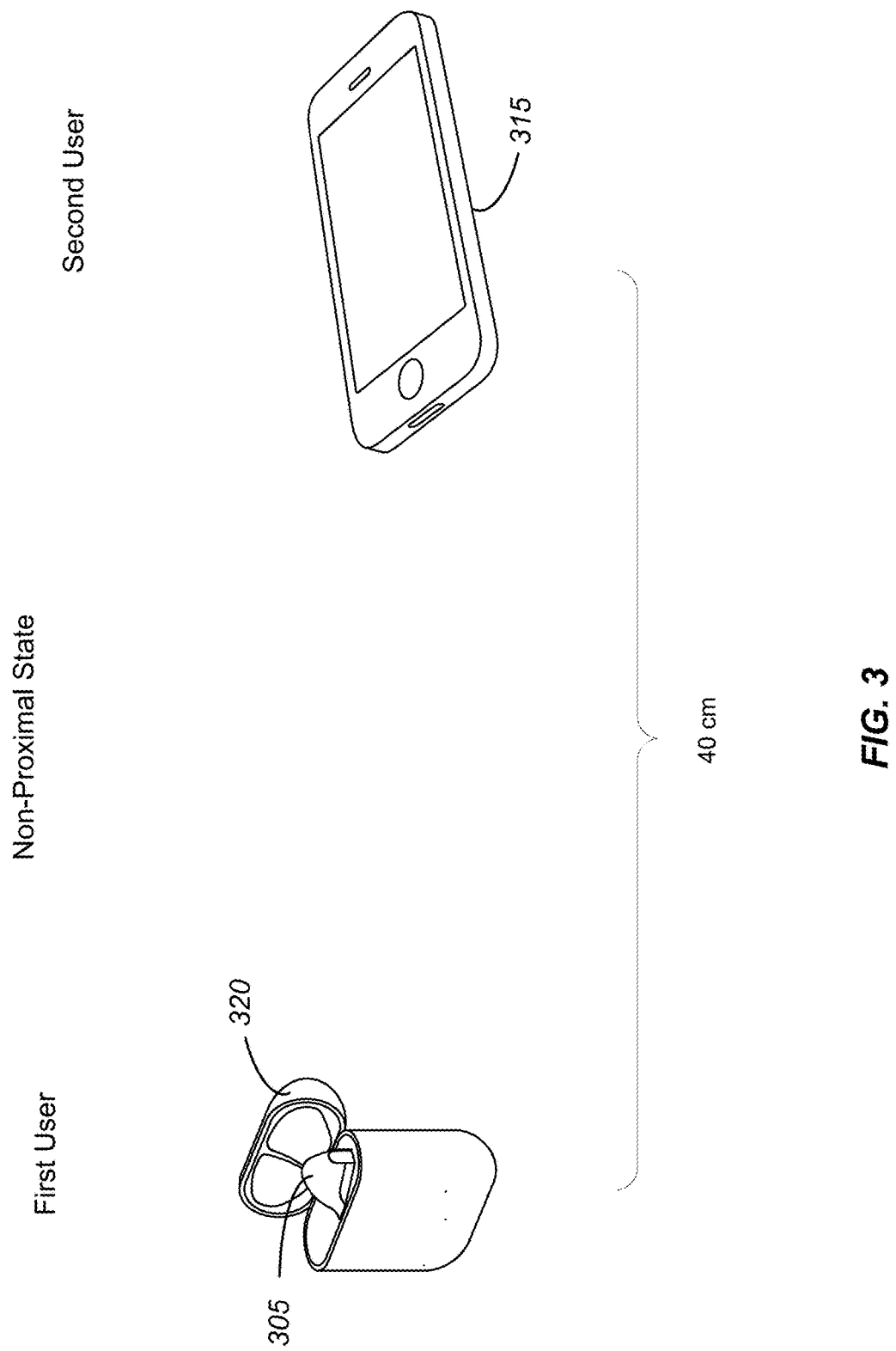
FIG. 3 shows a configuration corresponding to a non-proximal state of the initiator device and the responder device according to embodiments of the present invention.

FIG. 3 shows a configuration corresponding to a non-proximal state of the initiator device and the responder device according to embodiments of the present invention. The initiator device is shown as a phone 315, and the responder device is shown as headphones 305 inside a case 320. In this example, the two devices are 40 cm away. Other examples of typical distances for non-proximal states can be 30 cm or 50 cm. Phone 315 can belong to a first user and can be laying on a table (e.g., at a counter of a store). Case 320 can be on the same table, but belong to a different user, which may be sitting or standing next to the first user. Even if the users are sitting next to each other, a typical distance between the two devices would still be expected to be around 30-40 cm away. In such a situation, an automated pairing process based on proximity is not desired, and would correspond to a false positive if the pairing process was initiated between the two devices.

C. Measurements

The initiator device can measure a strength of the signal emitted from the responder device. The strength can correspond to an intensity of the signal, e.g., measured as a received signal strength indicator (RSSI). The signal strength can provide a measure of the power level of the received signal. The signal strength is larger when the emitting device is closer to the measurement device and is smaller when the emitting device is farther from the measurement device.

In various embodiments, a single measurement can be performed or multiple measurements can be performed, and then used to make a proximity decision, which may be performed in response to determining that a proximity analysis should be performed. When just a single measurement is performed, the measured signal strength can be used as a signal strength value for determining whether the two devices or in a proximal state or a non-proximal state. A single measured signal strength can be processed, e.g., for gain, normalization, or other properties, where the processed value is used as the signal strength value. When multiple measurements are performed, the measurements can be combined to provide the signal strength value. Multiple measurements may be made to increase accuracy.

Measurements of the signal strength can vary significantly from one time to another (fluctuating over time), even when the two devices are in a same configuration. Signal strength can vary for multiple reasons, e.g., due to interference from other signals and non-uniformity in the emitted signal. Further, devices are often moving slightly when being held. Thus, signal strength measurements of a proximal state and of a non-proximal state can briefly provide the same signal strength, even though the distance between the two devices is smaller for the proximal state. Using multiple measurements to determine the signal strength value can counterbalance the effects of such fluctuations.

Accordingly, accuracy can depend on the number of measurements. But, the number of measurements that can realistically be performed in an acceptable amount of time is limited. The number of measurements that can be performed can depend on latency in the system. Latency corresponds to a delay between measurements. The longer a measurement takes, the longer the latency between measurements. Latency can also depend on advertising rates and scan rates. The advertisement rate is how often the responder advertises a packet on different channels, e.g., each of the three BT advertisement channels. The scan rate depends on how often the initiator device scans on the channels or one the duty cycle of the scan. For energy efficiency, it is desirable to keep the rates low, but that can sacrifice accuracy and increase latency. Some embodiments can use certain techniques for combining measurements to determine the signal strength value, so as to achieve high accuracy without requiring an unnecessary number of measurements.

In some implementations, the scanning and advertisement rates can be dynamic. For example, if the responder device is plugged into the wall, then the advertising rate can be at a maximum rate, since power is not a concern. But, lower rates can be used when using a battery, potentially different rates at different battery levels. For example, pairing can often occur when a responder device is bought, and thus the battery life would often be at a maximum upon first use (e.g., after a full charging, per instructions). In such instances, the advertisement rate can be high, potentially based on the responder device not being previously paired.

Some embodiments may temporarily increase the advertising rate and/or the scanning rate in order to measure more RSSI samples per unit time. In some implementations, the scanning rate can be increased by detecting a first packet from the responder device, noting that it is within some coarse proximity, potentially with a different accuracy or resolution than the ultimate proximity decision. Once the scanning rate has been increased, the initiator device can operate in that mode for a period of time, and then return to its nominal scanning rate to conserve power. In other implementations, the advertising rate can be increased by user interaction with the initiator device (e.g., pushing a button or picking the device up) or by the initiator device detecting a nearby responder device via the responder's advertising packets. The scanning rate and the advertising rate could also be a function of the number of nearby devices. In a crowded environment (e.g., a store), the number of nearby devices that the user has no intention of pairing with could be quite large. In this case, scanning and/or advertising rates and the number of samples to filter/average can be chosen (e.g., chosen to be higher than normal) in order to increase accuracy of the proximity decision. For example, if more than N advertisement signals are detected, then the scanning rate and/or advertising rate is higher than when fewer than N advertisement signals are detected. A table can store a corresponding scanning rate and advertising rate for a specified number of detected signals.

Figure 4:
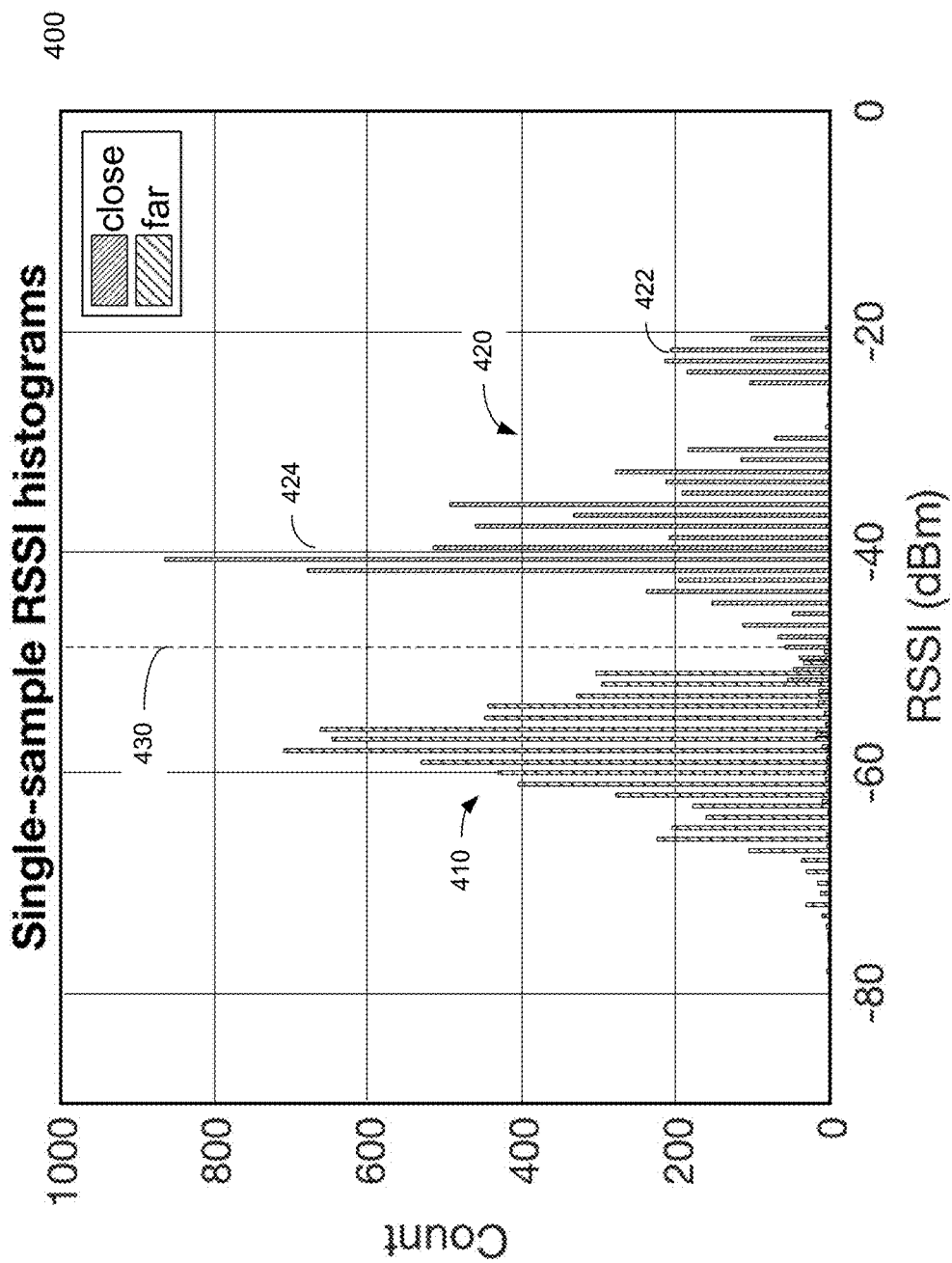
FIG. 4 shows a histogram of signal strength values measured at various configurations of proximal states and non-proximal states according to embodiments of the present invention.

FIG. 4 shows a histogram 400 of signal strength values measured at various configurations of proximal states and non-proximal states according to embodiments of the present invention. The horizontal axis corresponds to the measured RSSI in units of decibel-milliwatts (dBm). The stronger signals are on the right of the horizontal axis, having a smaller negative value. The weaker signals are on the left of the horizontal axis, having a larger negative value. The vertical axis corresponds to the number of measurements made having the corresponding RSSI value. RSSI is exponential as a function distance. At small distances, the change per unit distance is large, and thus higher resolution is possible. When far away, the change in RSSI per unit distance is smaller, and thus resolution is lower.

The measurements corresponding to non-proximal states are labeled as "far" and are shown in dark blue. The measurements corresponding to proximal states are labeled as "close" and are shown in light green. These measurements can be considered training samples, as their states are known, and can thus be used to train a human interaction (HI) model. Whether a configuration is proximal or non-proximal can be determined before the measurement is performed and be based on expected user intent. Two clusters of measurements are evident in histogram 400. These training measurements can be taken as part of a training experiment for two types of devices (e.g., a phone and headphones). Other pairs of devices might provide a different histogram, depending on how different the devices are.

Cluster 410 corresponds to the non-proximal measurements, and cluster 420 corresponds to the proximal measurements. Cluster 420 includes two sub-clusters 422 and 424, with sub-cluster 424 corresponding to configurations where at least one of the devices is held within a hand or where there is some other obstruction. These configurations in sub-cluster 424 are still proximal, but have a lower signal strength. For proximal cluster 420, the RSSI distribution looks fairly Gaussian and symmetric. Non-proximal cluster 410 does not look Gaussian as it has a tail, which can be due to multipath signals that may bounce off of one or more reflectors before reaching their destination.

A new measurement for which a state is not known can be classified as proximal or non-proximal based on histogram 400. Since histogram 400 shows two clusters that are separated from each other, a threshold value can be used to classify the new measurement. For example, a threshold 430 can be used to classify the new measurement. Signal strength values above (to the right of) threshold 430 can be labeled as proximal states, and signal strength values below (to the left of) threshold 430 can be labeled as non-proximal states. The exact RSSI value to assign to threshold 430 depends on the desired trade-off between sensitivity versus specificity, i.e., a balance between the number of false positives and false negatives. In some implementations, the threshold can be chosen to have fewer false positives than false negative. For example, as a user who has intent to initiate the pairing process would likely bring the two devices closer until a pairing process is initiated, thereby moving away threshold value in providing a clear classification. Whereas, a false positive due to an inadvertent measurement that is close to the threshold may annoy the user.

D. Signal Strength Values

The signal strength value can be measured in various ways. For example, a set of measurements can provide a vector R corresponding to measurements from all advertising channels. The signal strength value can be determined from the measurements in vector R, and the signal strength value can be used to provide a decision about whether the two devices are proximal or non-proximal. The values in R can be used in various ways to determine the signal strength value, e.g., by selecting a mean (average) of the values, a median of the values, or a maximum of the values in vector R.

In one embodiment, a max-of-mean value can be determined. This technique can account for both the vector of RSSI values and the channel numbers. Three vectors of measurements can be obtained—one for each channel. A mean can be calibrated of the measurements for each vector, and thus three mean values can be determined. Then, a maximum of those mean values can be selected as a signal strength value. The mean values can reduce noise, which otherwise might occur when taking the maximum value of all measurements. Further, one channel can be degraded due to interference, which could lead to problems when a single mean value is computed across all channels. Using the max-of-mean value would filter out the data of that bad channel (i.e., the channel degraded due to interference).

As another example, an estimator of the signal strength value can determine a percentage of the signal strength measurements at a high end (e.g., above a percentage or absolute value) and a low end (e.g., below a percentage or absolute value) and then average the remaining measurements.

Figure 5:
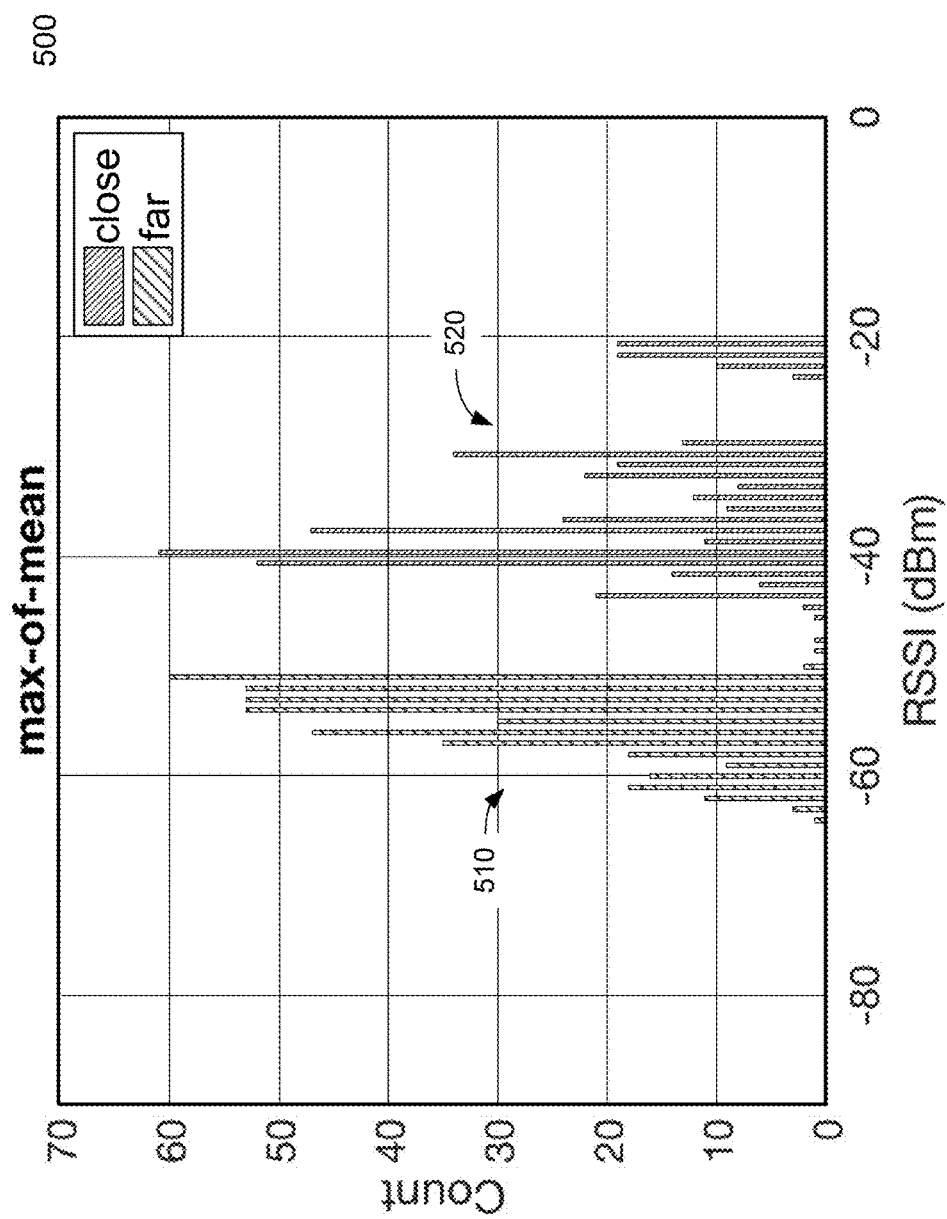
FIG. 5 shows a histogram of signal strength values measured at various configurations of proximal and non-proximal states using max-of-mean technique according to embodiments of the present invention.

FIG. 5 shows a histogram 500 of signal strength values measured at various configurations of proximal and non-proximal states using max-of-mean technique according to embodiments of the present invention. The axes of histogram 500 are similar to histogram 400, but the RSSI values are not of single measurements. Instead, the RSSI values correspond to a max-of-mean value of a set of measurements made of a given configuration. The cluster 510 measurements corresponding to non-proximal states are labeled as "far" and are shown in dark blue. The cluster 520 of measurements corresponding to proximal states is labeled as "close" and is shown in light green. The RSSI values of the two clusters in histogram 500 are more clearly separated than the clusters in histogram 400, thereby indicating that the max-of-mean technique can provide higher accuracy.

In another embodiment, a Rayleigh fitting technique can be used to determine the signal strength value. A Rayleigh distribution is obtained when there are line-of-sight and non-line of sight signals. The set of measurements at a given configuration can be fit to a Rayleigh distribution, and then the mode (peak) of the Rayleigh distribution may be computed. For example, one can vary a parameter of the Rayleigh distributions to obtain a best fit. And, then one can compute the maximum likelihood or the mode of that curve. The parameter can determine a width of the distribution, where a higher power can correspond to measurements that are tight together. A lower parameter can correspond to measurements that are more spread out. Another parameter can move the distribution along the horizontal axis.

Figure 6:
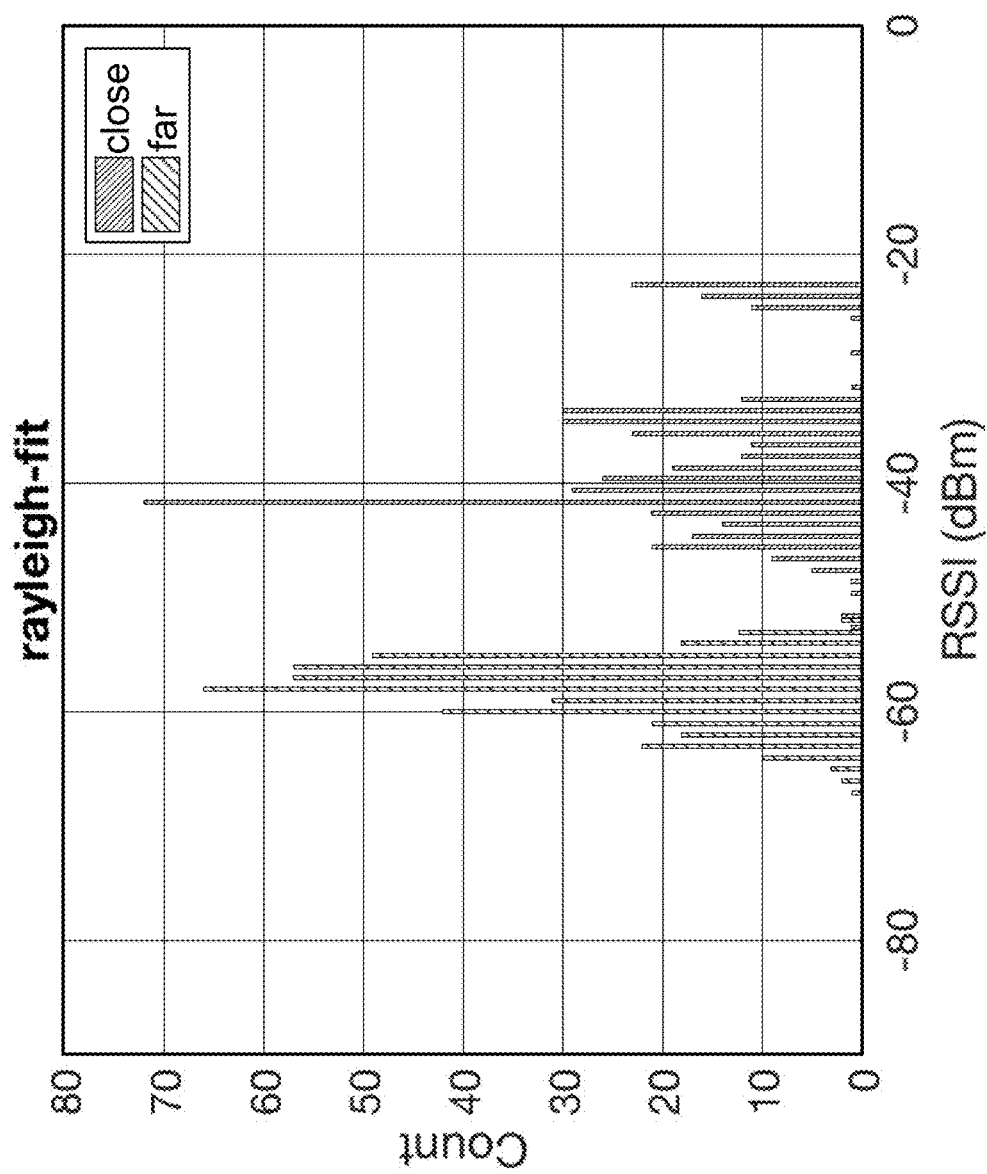
FIG. 6 shows a histogram of signal strength values measured at various configurations of proximal and non-proximal states using a Rayleigh-fit technique according to embodiments of the present invention.

FIG. 6 shows a histogram 600 of signal strength values measured at various configurations of proximal and non-proximal states using a Rayleigh-fit technique according to embodiments of the present invention. The axes of histogram 500 are similar to histogram 400, but an RSSI value correspond to the mode of the Rayleigh distribution fit to a set of measurements at a given configuration.

E. Method

Figure 7:
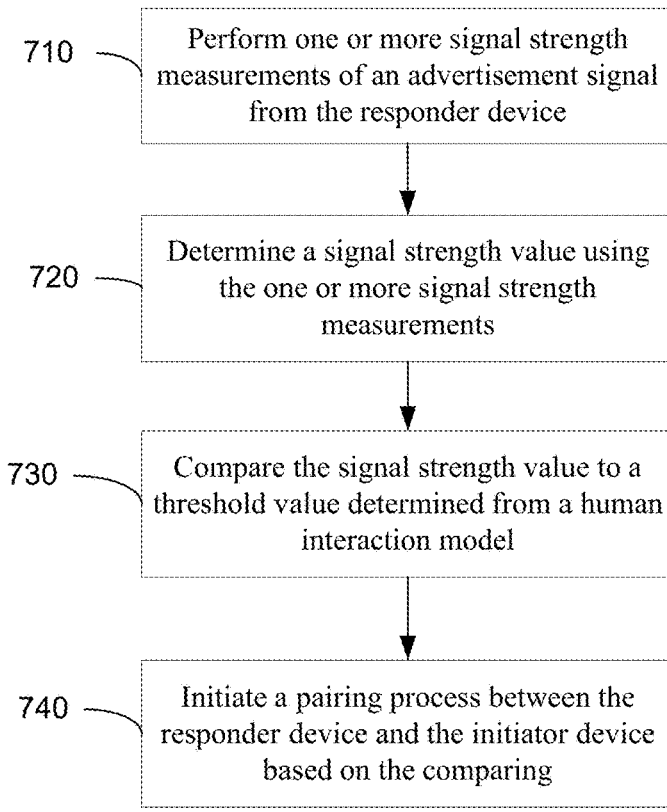
FIG. 7 is a flowchart of a method of electronically pairing an initiator device to a responder device according to embodiments of the present invention.

FIG. 7 is a flowchart of a method 700 of electronically pairing an initiator device to a responder device according to embodiments of the present invention. Method 700 can be performed by the initiator device, e.g., by one or more processors of the initiator device. The responder device and the initiator device may both be mobile devices.

At block 710, one or more signal strength measurements are taken of an advertisement signal from the responder device. Before the signal strength measurements are performed, the advertisement signal can be analyzed to determine whether to perform the one or more signal strength measurements. In one embodiment, analyzing the data in the advertisement signal can include identifying a field in the advertisement signal that indicates that the responder device has not been previously been paired with another device. When the initiator device determines that the other device has not been previously paired to any other device, the initiator device can proceed to perform a proximity analysis. In this manner, the initiator device can avoid inadvertently initiating pairing with all devices that it encounters.

At block 720, a signal strength value is determined using the one or more signal strength measurements. The signal strength value can be determined in various ways. For example, the signal strength value can correspond to the one signal strength measurement taken. When a plurality of signal strength measurements are obtained, an average or a median value of the signal strength measurements can be determined. In other embodiments, probability distributions can be used.

In some embodiments, a proximal probability can be determined for each of the plurality of signal strength measurements. The proximal probability of the signal strength measurement can be determined by comparing the signal strength measurement to a proximal probability distribution (e.g., as described later for FIG. 11B). The proximal probability distribution can be generated using measurements of one or more other responder devices and one or more other initiator devices in a plurality of configurations. The proximal probability of the signal strength measurement can correspond to user intent to initiate the pairing process. The proximal probabilities can then be used to determine the signal strength value, e.g., a sum or product of the proximal probabilities.

In one embodiment, non-proximal probabilities can be determined in a similar manner. A non-proximal probability can be determined for each of the plurality of signal strength measurements. The non-proximal probability can be determined by comparing the signal strength measurement to a non-proximal probability distribution. The non-proximal probability distribution can also be generated using the other measurements of the one or more other responder devices and the one or more other initiator devices in a plurality of configurations. The non-proximal probability can correspond to a user intent to not initiate the pairing process. The signal strength value can be determined by comparing the proximal probabilities to the non-proximal probabilities, e.g., as a ratio of a first product of multiplying the proximal probabilities and a second product of multiplying the non-proximal probabilities.

At block 730, the signal strength value is compared to a threshold value. The threshold value can be determined by a human interaction (HI) model that discriminates between proximal states of the responder device and non-proximal states of the responder device. The human interaction model can be generated using other measurements of one or more other responder devices and one or more other initiator devices in a plurality of configurations.

At block 740, a pairing process is initiated between the responder device and the initiator device based on the comparing of the signal strength value to the threshold value. Before the pairing process is initiated (at least before further steps are performed), a user can be prompted for confirmation. Accordingly, based on the comparing of the signal strength value to the threshold value, a confirmation option can be provided (e.g., displayed or via a voice interface) to a user to confirm that the pairing process is to be initiated. The responder device and the initiator device can then be paired in response to the user input.

The initiator device may store more than one HI model, e.g., different models for different types of responder devices. In some embodiments, the type of the responder device can be identified, e.g., based on data fields in the advertisement signal or in a pairing response. The type of the responder device can be used to select the HI model from a plurality of HI models.

Further steps of the pairing process can include steps the same or similar to FIG. 1. For example, after determining that the devices are proximal to each other, a pairing request can be sent to the responder device. A pairing response can be received from the responder device, and an authentication process can be performed to authenticate the responder device. One or more keys can be exchanged with the responder device, e.g., as part of bonding the two devices. These keys can be used to perform communication in a later communication session, without the need to perform another pairing. Thus, a current communication session with the responder device can end. Then, at a later time, a new communication session can be established using the one or more keys, where the new communication session can be established without performing the pairing process.

III. Responder Device

The responder device provides an advertisement signal for the initiator device to detect the existence of the responder device, so that the pairing request can be sent. The responder device can then respond to the pairing request from the initiator device. The responder device can be of various types, as described below. The advertisement signal can vary for the different types, and can include various information.

A. Types

FIGS. 8A-8D show example responder devices according to embodiments of the present invention. Each of the responder devices may have a different protocol for when advertisement signals are emitted. As examples, headphones can emit the advertisement signal when a case is first opened, a speaker can emit the advertisement at a higher rate when plugged in than when not plugged in, and a new phone can emit the advertisement signal when it is first turned on. The responder devices can have one or more antennas in various positions and have different form factors. Thus, the signal strength at different distances from an initiator device can vary depending on the type of responder device. There can be different initiator devices as well.

Figure 8:
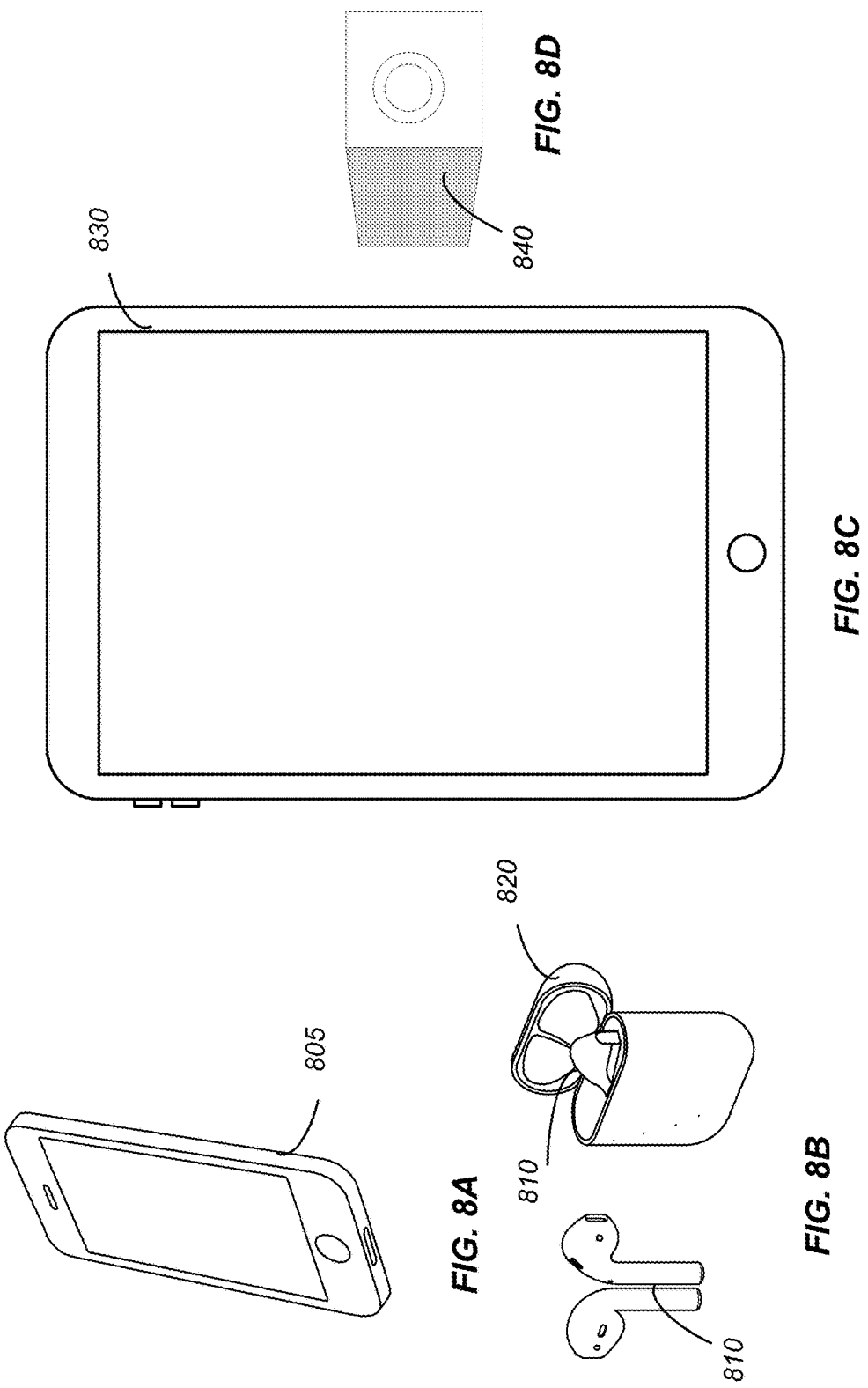
FIGS. 8A-8D show example responder devices according to embodiments of the present invention.

FIG. 8A shows a phone 805. In such instances, phone 805 might be of a user other than the user of the initiator device. For example, a user may want to obtain data (e.g., a WiFi password) from another friend, and thus request pairing of the user's initiator device to phone 805. As another example, phone 805 could be a new phone of the same user of the initiator device. Phone 805 can also be a type of initiator device FIG. 8B shows headphones 810, which may be in a case 820. In one embodiment, headphones 810 can begin emitting the advertisement signal when case 820 is open for the first time. The first opening can be tracked by a stored flag that gets set once the case is first opened. In another embodiment, headphones 810 can emit an advertisement when a flag indicates that headphones have not been paired.

FIG. 8C shows a tablet 830, which can be an initiator device or a responder device. Tablet 830 could be of a user that is the same or different from user of the initiator device. Due to its larger size, tablet 830 may include multiple antennas to increase the accuracy of the proximity determination.

FIG. 8D shows a speaker 840, which may include a light that indicates whether speaker 840 is currently paired with another device. For example, the user of the initiator device may have two speakers and perform respective pairing processes for each one. If the speakers are next to each other, the user may not know which speaker was just paired. The light on the speaker can indicate which speaker was just paired.

Accordingly, when initially pairing two similar devices (e.g., a left speaker and a right speaker), the two responder devices might be right next to each other. In such a situation, the pairing might inadvertently occur with the right speaker, even though the user intended to pair the left speaker first. The device that is just paired can provide an indication that it was just paired, e.g., a light can turn on, such as blinking, or a sound can be made. In this manner, the user can place the paired speaker in the correct position. Also, once the first speaker is paired, its advertisement signal can stop, thereby allowing the second speaker to pair.

The responder device can provide a particular advertisement signal until it is paired with a device. For example, the advertisement signal can identify that the device is not paired. In some instances, the advertisement signal can include a field that indicates the responder has not been paired before. Once paired, the responder device can determine to stop emitting the advertisement signal. Another field can be dedicated to providing specific information. For example, the advertisement signal can also include a unique identifier in a particular field.

The advertisement signal can be changed or started based on user input. For example, the advertisement signal from headphones can be triggered by the opening of a headphone case. In another example, the advertisement signal can be triggered by a button on the headphone case, which may include electronics for communicating with the headphones.

In some embodiments, it is possible to set up multiple devices simultaneously. For example, a responder device can include multiple sub-units. In the case of headphone, the pairing can be done for both headphones as part of the same process, e.g., by one headphone communicating any key(s) to the other headphone. A case can count as a third sub-unit. The sub-units can be considered associated by getting paired together. Another example would be two game controllers.

B. Pairing request and response

As described in FIG. 1, the responder device can send a pairing response message to the initiator device in response to a pairing request message. Fields of the response message can include information about the responder device. For example, fields can include information about capabilities of the device. Translation tables can be used to determine a particular meaning of value in a particular field. For instance, the value '5' in the third field can be translated to correspond to a battery level of the responder device. The particular values in the fields can affect which authentication process is used in the pairing process.

FIG. 9 shows the fields of an example pairing request/response according to embodiments of the present invention. The Code field 901 can indicate whether the message is a pairing request or a pairing response. The IO Cap field 902 can indicate whether the device has input capabilities, one or more buttons to indicate yes/no, and whether that the device has a keyboard. For output capabilities, examples are 'no output' or 'numeric output.' The out of band (OOB) field 903 can be used to communicate a protocol for transmitting information using a different protocol. The OOB channel could be any other wireless communication standard which can carry the corresponding information for pairing, like NFC or QRCode.

The bonding flag (BF) field 904 corresponds to the exchange of long-term keys after pairing. In one aspect, pairing is the mechanism that allows bonding to occur. And, bonding allows future communications between the devices to forego the pairing process, as each side will already have keys that correspond to the secure communication channel between the two devices. The man-in-the-middle (MITM) field 905 can correspond to whether the device is requesting protection from a man-in-the-middle attack.

The SC field 906 can specify the type of key exchange for pairing, e.g., a short-term key exchange (legacy pairing) or a long-term key exchange (secure connection). The KC field 907 can be used when Passkey Entry is used for authentication. Filed 908 can specify a maximum encryption key size. Initiator Key Distribution 909 and Responder Key Distribution 910 can be used for the key exchange phase.

With the information in the pairing request and response, the initiator device and the responder device can determine the I/O capabilities with each other, which pairing mechanism (e.g., legacy pairing or secure connection) should be used, and select the pairing method (e.g., Just Work, Passkey Entry, Numeric Comparison or Out of Band) to use in Phase 2.

IV. Human Interaction Model

The human interaction model can be used to distinguish between proximal and non-proximal states. Expectations of human interaction with each other and with devices can be used to label certain configurations as proximal or non-proximal, and measurements at those configurations (e.g., distances) can be used to create the model.

A. Gathering Training Samples

Once a set of proximal configurations (e.g., as shown in FIGS. 2A and 2B) and a set of the non-proximal configurations (like FIG. 3) have been specified, measurements can be taken at those configurations to obtain training samples. A training sample can include one or more measurements at a given configuration and a label of whether the configuration is proximal or non-proximal. The training samples can be used to generate histogram plots as described above. In more sophisticated models (e.g., machine learning models), the model can learn from the measurements and the labeled states of the training samples.

FIGS. 10A-10D show different configurations of a particular pair of devices that are in proximal states according to embodiments of the present invention. As shown, responder device 1010 can be in various positions relative to initiator device 1015, e.g., to the side of it, behind it, or in front of it. Other configurations can include the responder device sitting directly on top of the initiator device, which may occur while the user is interacting with the initiator device. This configuration space can be sampled to include all or nearly all configurations that would be expected to be used by users. This histogram can be a composite of the measurements from these proximal configurations and the non-proximal configurations.

To determine the configurations to use, observations can be made of users as they interact with the two devices. These observations can lead to evaluating the likelihood of people placing the two devices in particular configurations. Video can be used to identify the most common configurations, e.g., as measured by the number of times a user places the two devices into a given configuration or the amount of time spent in a given configuration. In some embodiments, the most common configurations can be sampled the most, so that the model will be accurate for the most common configuration. The high sampling of common configurations can correspond to peaks in the histogram.

In some embodiments, simulation data can be used to provide the training samples. The simulation data can be generated more efficiently, as it is less manual than placing various pairs of devices into various configurations and performing measurements. To perform the simulation, antenna patterns can be determined using measurements in an RF chamber—either at the far field and/or the near field. These measurements can be modified in the simulation based on predictions, e.g., based on the antenna gain patterns and polarity patterns. A specified amount of attenuation through the body can be specified for configurations in which either or both of the devices are held, and the attenuation can be used to modify the expected measurement via the simulation. Changes in a new version of a device can be combined with previous measurements, e.g., by multiplicative or additive transformations on the previous measurements. Such simulation can substantially reduce the amount of data collection needed.

Some or all of the training samples could also be gathered by crowd-sourcing the measurements. User feedback can identify signal strength measurements as proximal or non-proximal, e.g., based on whether a user confirms that pairing should be performed when prompted (proximal) or does not confirm (non-proximal). These training samples can be stored on a device, tagged with the corresponding proximal or non-proximal label, anonymized, and then transferred with relevant associated identifiers (e.g., device models, software builds, algorithm used to determine the signal strength value, etc.) to one or more servers for generating or revising a model.

B. Creating Model

A different model can be created for each unique pair of devices (i.e., initiator device being a first type and the responder device being a second type). Once signal strength measurements are made for the training samples, a histogram can be generated. Two clusters of measurements can be identified in the histogram, where the model can be used to discriminate between the two clusters for a new measurement. As examples, the model can involve a simple threshold or probability distributions that can be used to determine probabilities for multiple measurements made in a new configuration. The technique used can depend on the amount of overlap between the two clusters.

In some embodiments, the model can be trained to focus on the most common configurations, thereby providing higher accuracy for the most common configurations. Thus, embodiments may identify which configurations are most important, e.g., prioritize them or weight them. For example, 90% of people may put the initiator device on the left and responder device on the right, whereas 1% of people do the opposite. Embodiments can weight certain samples so that the model is more representative of what users actually do. The weighting can increase the effort spent getting training samples having higher weights correct, e.g., when a machine learning model is used. When a histogram is used, the effect can be to change the measurement counts at a given signal strength, thereby changing placement of a threshold that is selected based on a desired sensitivity and specificity.

Figure 11A:
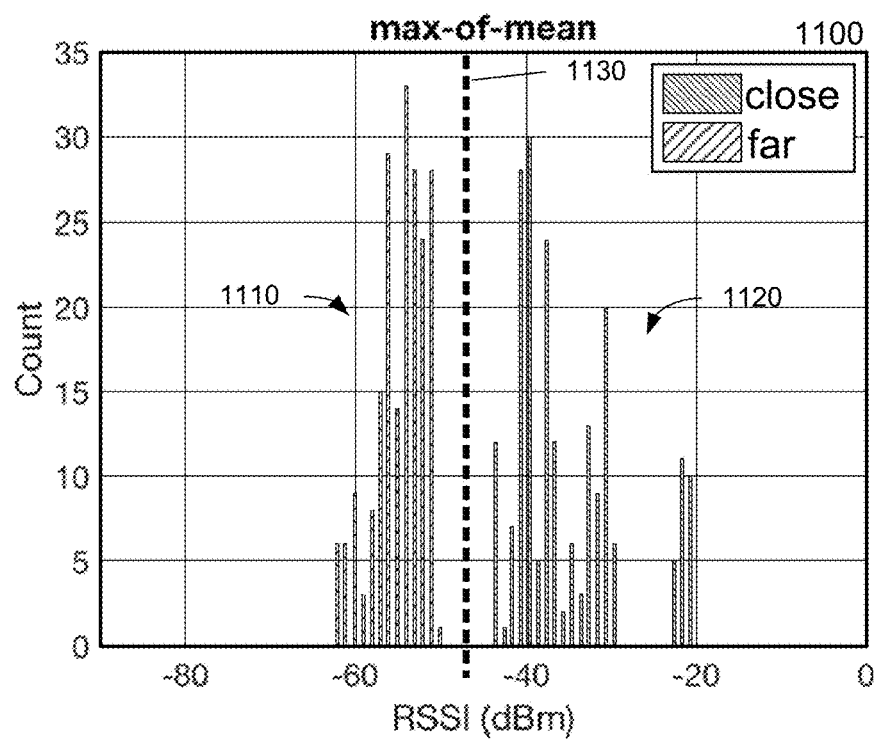
FIG. 11A shows a histogram of signal strength values of proximal (close) and non-proximal (far) states and a threshold value for discriminating between the states according to embodiments of the present invention.

FIG. 11A shows a histogram 1100 of signal strength values of proximal (close) and non-proximal (far) states and a threshold value for discriminating between the states according to embodiments of the present invention. Cluster 1110 corresponds to non-proximal signal strength values, and cluster 1120 corresponds to proximal signal strength values. As can be seen, the two clusters do not overlap, thereby indicating that a threshold 1130 can be used with high accuracy. Threshold 1130 can be around −48 dBm, which is in the gap between the two clusters.

In another embodiment, a hypothesis test can be used, e.g., when the two clusters do overlap. Once a histogram is obtained for a particular pair of products, the histogram can be parameterized, e.g., via a curve fitting process that provides a probability distribution. The result is two curves: one curve for proximal states and the other curve for non-proximal states. The two curves can each correspond to a probability distribution.

The measured signal strengths for a new configuration can be used to determine two sets of probabilities, one for each probability distribution. For the proximal distribution, a measured signal strength can be used to determine the Y value (the probability) for that measurement. For that same measured signal strength, a probability is also determined for the non-proximal distribution. The two probabilities correspond to probabilities for the two hypotheses: H0 of a proximal state and H1 of a non-proximal state. The two sets of probabilities (e.g., one H0 probability and one H1 probability, for each measured signal strength) can be used to determine the signal strength value that is compared to a threshold.

In one embodiment, the Neyman-Pearson test can be used to determine the signal strength value from the two sets probabilities. A ratio can be determined of the product of the proximal probabilities and the product of the non-proximal probabilities. The ratio can then be compared to a threshold to confirm that the proximal product is sufficiently higher than the non-proximal product. Other combination of the measured probabilities can also be used.

Figure 11B:
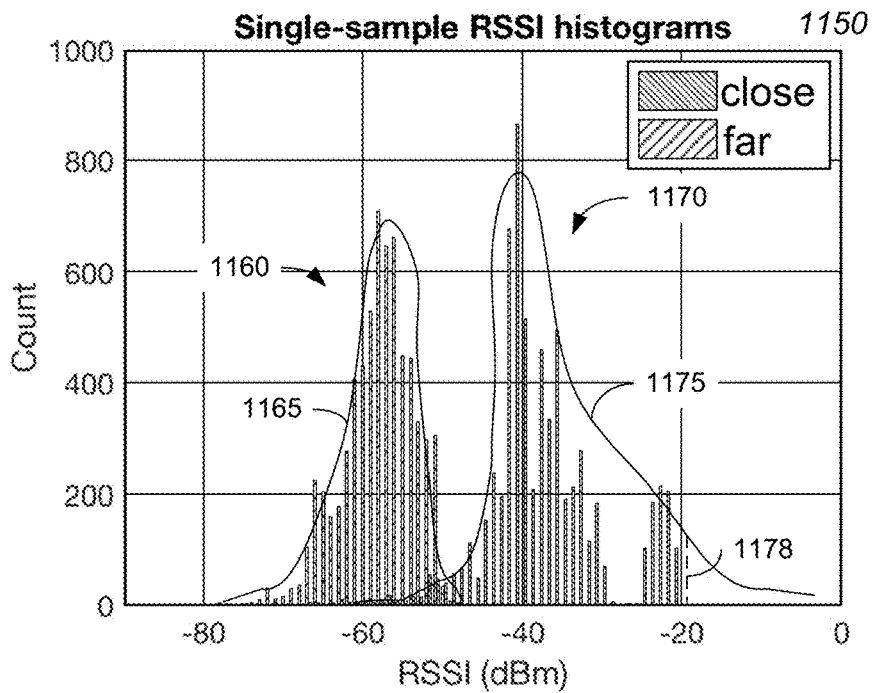
FIG. 11B shows a histogram with a non-proximal cluster and a proximal cluster that overlap and can be discriminated using hypothesis testing according to embodiments of the present invention.

FIG. 11B shows a histogram 1150 with a non-proximal cluster 1160 and a proximal cluster 1170 that overlap and can be discriminated using hypothesis testing according to embodiments of the present invention. A probability distribution 1165 can be fit to non-proximal cluster 1160, and a probability distribution 1175 can be fit to proximal cluster 1170. The higher count at −40 dBm can result from those configurations being sampled more, as they are expected to be most common.

The probability distributions can then be used to determine the probability that each measurement is proximal or non-proximal. For example, a measurement 1178 at −20 dBm may have a probability of 0.2 of being proximal state, but the non-proximal probability would essentially be zero, since the probability distribution 1165 essentially reaches zero around −47 dBm. If multiple measurements are made of a configuration that is ultimately a proximal configuration, the values might range from −20 dBm to −55 dBm, with differing probability values, but the proximal probability values would collectively be higher than the non-proximal probability values, e.g., as measured by a ratio of the products of the respective probability values.

C. Use and selection of Model

An initiator device can pair with various types of responder devices (e.g., as shown in FIGS. 8A-8D). As the model can vary for different configurations of devices, the initiator device may need to select a different model for different responder devices. The advertisement signal or a paring response message from the responder device can identify the type of the responder device, thereby allowing the initiator device to identify the model that should be used.

Figure 12:
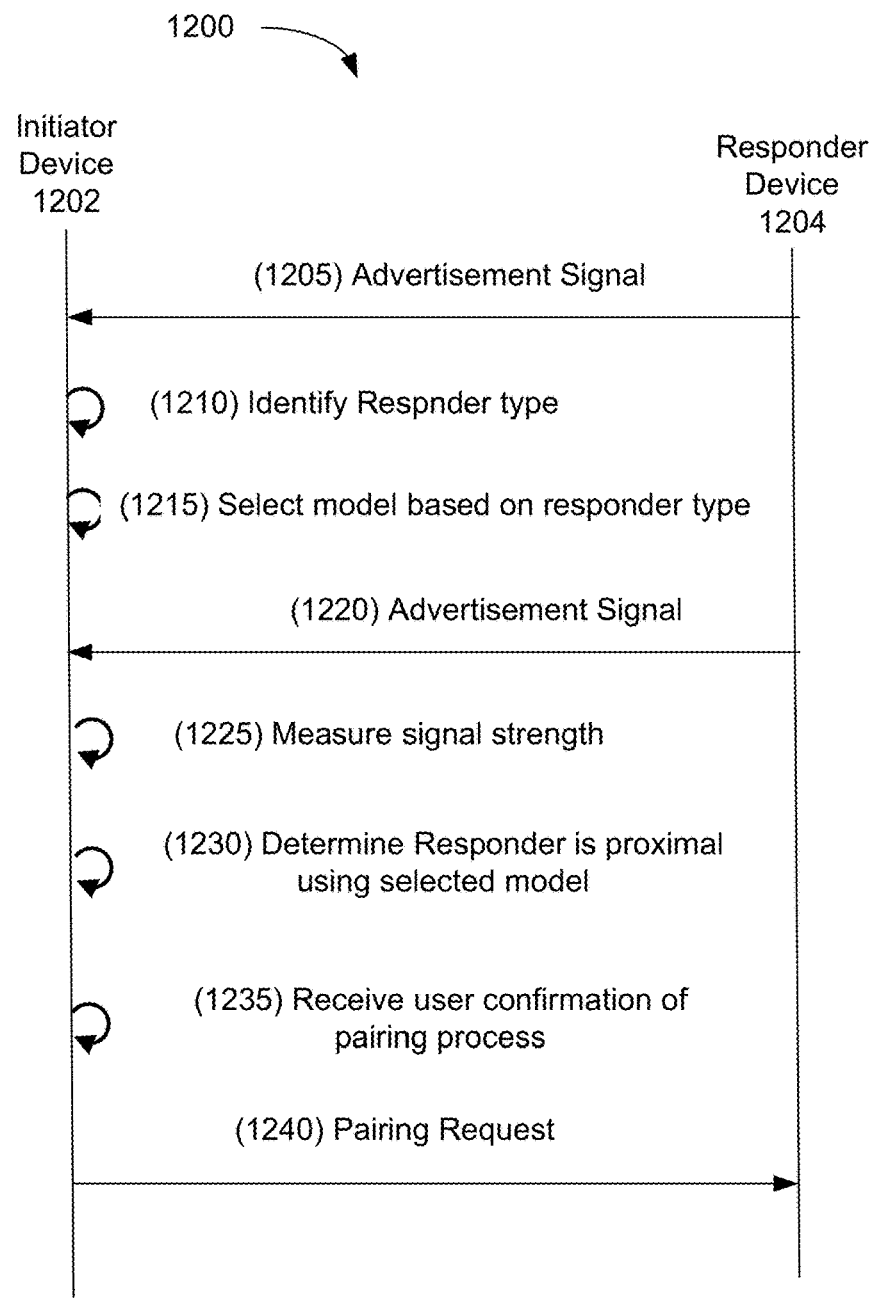
FIG. 12 is a sequence diagram showing operations for an initiator device to select a model based on a type of a responder device according to embodiments of the present invention.

FIG. 12 is a sequence diagram 1200 showing operations for an initiator device 1202 to select a model based on a type of a responder device 1204 according to embodiments of the present invention. Sequence diagram 1200 shows a process of initiator device selecting a model based on information in the advertisement signal, and the model being used to determine whether to send a pairing request. A similar process can also be performed based on information obtained in a pairing response, where the model is used to determine whether to proceed with authentication.

In step 1205, responder device 1204 sends an advertisement signal to initiator device 1202. The advertisement signal can include an identifier (e.g., one or more bits) that identifies the type of responder device 1204. As examples, the different types can correspond to the examples provided in FIGS. 8A-8D.

In step 1210, initiator device 1202 identifies the responder type using the identifier. For example, initiator device 1202 can store a table that correlates the identifier with a type of device. Initiator device 1202 can determine to perform a proximity analysis before or after step 1210, e.g., based on information included in the advertisement signal.

In step 1215, initiator device 1202 can select a model corresponding to the responder type. In one embodiment, the identifier in the advertisement signal can be used to directly select the model. For example, the models can be stored associated with the identifiers, and thus the desired model can be selected. In this manner, the particular model with its own specific parameters (e.g., threshold value and potentially any associated probability distributions) can be selected for the particular types of devices that are to be paired. In some implementations, a default model can be used if no identifier is present in the advertisement signal or if the identifier data does not match any identifiers stored at initiator device 1202.

In step 1220, the advertisement signal is continued to be sent by responder device 1204. In some embodiments, the receiving of the advertisement signal after selecting the model is optional, e.g., when the advertisement signal received at step 1205 can be measured.

In step 1225, initiator device 1203 can measure the signal strength using the advertisement signal received in step 1205 or step 1220. The measurement may occur multiple times so that a plurality of measured signal strengths is obtained. These measured signal strengths can be combined into a signal strength value that can be compared to a threshold value to determine whether the devices are proximal.

In step 1230, the initiator device 1203 determines whether responder device 1204 is proximal using the selected model and the measured signal strength(s). This determination can be made as described herein, e.g., using method 700.

In step 1235, the initiator device 1202 can provide an option (e.g., visually and/or audibly) for a user to confirm whether the user would like to pair the two devices. The confirmation option can be provided automatically without the user needing to navigate to a particular settings page. For example, the confirmation option can be displayed on a lock screen. In some implementations, the notification can provide the responder type. The providing of the notification can be part of a pairing process.

In step 1240, a pairing request can be sent from initiator device 1202 to responder device 1204 when the responder device is proximal. After sending the pairing request, the pairing process can continue as described in FIG. 1. In other embodiments, step 1205 can instead be a pairing request or a pairing response, which can include the identifier about the responder type. In such an embodiment, pairing requests and/or responses may be sent more often, but a proximity check would still occur before the pairing was completed. For example, a proximity check can be performed before the confirmation option is provider to the user.

Other variations in devices relate to antennas. In some embodiments, an initiator device can have more than one antenna. In such a case, a model can be generated based on measurements from all antennas. In another example, a model can be generated for each antenna. The antenna with the strongest measurements can be selected for providing the signal strength value. Different models can be used for different antennas. The model can thus be selected based on which antenna has the strongest measurement(s). After the identification of which antenna to use, the other antenna(s) do not need to be 'on,' as their measurements are not needed.

Further, the responder device could have multiple antennas, and the advertisement signal could identify which antenna it is from, e.g., via a bit in the advertisement signal or a pairing response. The selected model could be specific to a particular pair of antennas in the initiator device and the responder device. In other embodiments, a particular antenna can always be selected for transmitting advertisement signals from the responder device, and a particular antenna can always be selected for performing measurements on the initiator device. Thus, no determination of which antenna to use would be required in such implementations. Which antenna to use could switch for other things, like audio connection, but for advertisements and scanning a default antenna can be used.

If one or both of the two devices is relatively large (e.g., one dimension being greater than 20 cm), the location of the antenna can cause significant variations in the signal strength measurements. One user might place the responder device near the initiator device, but at a corner that is far from the antenna. To address this issue, instructions can be provided for a particular configuration (e.g., placement near a particular corner) to perform an initial pairing of the responder device with an initiator device.

V. Additional Functionality after Paired

Once the pairing is completed, a specific action can be performed, e.g., a specific type of data communication. The specific action can depend on values in one or more specific data fields in a message received from the responder device, such as the advertisement signal (e.g., capabilities or whether the device has ever been paired before). Some examples are provided below.

A. Transferring Data to New Device

In one example, the responder device can be a new device that is to replace the initiator device. The user may wish to transfer data and settings from the old device to the new device. The advertisement signal can indicate the responder device is a new device, thereby providing an indication that such a transfer to the responder device is desired. In this manner, the transfer process is streamlined. A user prompt can still be provided at one or both of the devices to confirm the transfer process.

The trigger for such a transfer process can be initiated by data sent after pairing is complete. In such a case, the user might just be prompted for confirmation of pairing, but not necessarily prompted for confirmation of the transfer process, as that user intent can be inferred by the new device indicating that it has not been set up yet. In some implementations, an authentication can be required, as may occur for biometrics, such as a fingerprint. Another authentication can be a photo of a special image on the responder device. Such a notification could identify that the responder device is a new phone, and require confirmation that the user would like to set up the new phone with the exact same settings.

B. Exchange Passwords

Another action could be an exchange of passwords for a network, e.g., so a visiting friend can access a user's WiFi network at the user's home. A first user of the responder device can provide user input to send a particular advertisement signal indicating that a WiFi password is desired. For example, the responder device can prompt the first user to confirm that the first user wants to connect to a network for which no password is currently known. After or before pairing is done, a confirmation option can be sent to the initiator device to confirm that the user agrees to send the password to the responder device.

In another example, the responder device can detect a network for which it does not have the password, and automatically provide an advertisement signal in attempt to receive it. Instructions can be provided to the friend's device to bring the responder device near the initiator device. In some embodiments, confirmation can be made at the initiator device that the responder device is in the contacts list (or vice versa), thereby providing a level of authentication.

For the purpose of exchanging data (e.g., WiFi passwords) among devices of different people, the selected HI model could be different than is selected for other intended purposes, e.g., when pairing headphones or setting up a new device. The HI model can be selected based on information in the advertisement signal or other message that specifies this intended purpose. Once confirmation is provided at the initiator device (e.g., via contacts list and/or explicit confirmation from the user, via a button, verbal instructions, etc.), the WiFi password can be sent.

In some embodiments, the roles of the initiator and the responder can be reversed, i.e., for the homeowner and the visitor. The visitor's device can provide a notification when the visitor selects a network (e.g., the SSID of the network). The visitor's device can convey that the user is in proximity, e.g., based on an advertisement signal from the homeowner's device. The visitor's device can confirm the homeowner's corresponds to a contact in the visitor's device, or some other authentication ca be performed, e.g., via a notification and user confirmation of the homeowner's device. Once paired, the homeowner's device can prompt for whether to share the password.

C. One Time Use v. Multiple

Some actions might only occur once, such as setting up a new device or providing a password, but other actions might occur multiple times. For example, music might be transferred from one device to another (e.g., to play on speakers) when the initiator device gets sufficiently close to the responder device. Or, a battery status might be provided from the responder device.

When the action only occurs once, a higher rate of false positives can be tolerated. For example, a false positive rate of 1% or 0.1% might be tolerated. But, if the action is done multiple times, then the false positive rate would ideally be lower. A higher success rate would also be desired. To achieve the desirable success and false positive rates, a different model can be used when such actions are performed, e.g., proximal states can be required to be much closer. Thus, a given configuration may be labeled as proximal for setting up a new device, but be labeled non-proximal for the purpose of automatically transferring music to speakers.

The advertisement signal can include information (e.g., a data field) that specifies the type of action to be performed, and this field can also be used to identify a particular human interaction (HI) model to use. Multiple data fields can be used to determine the model to use. For example, the responder type as well as the action field can both be used to select the desirable model that corresponds to the specific pair of devices, but also the specific context (e.g., the action to be performed).

VI. Example Device

Figure 13:
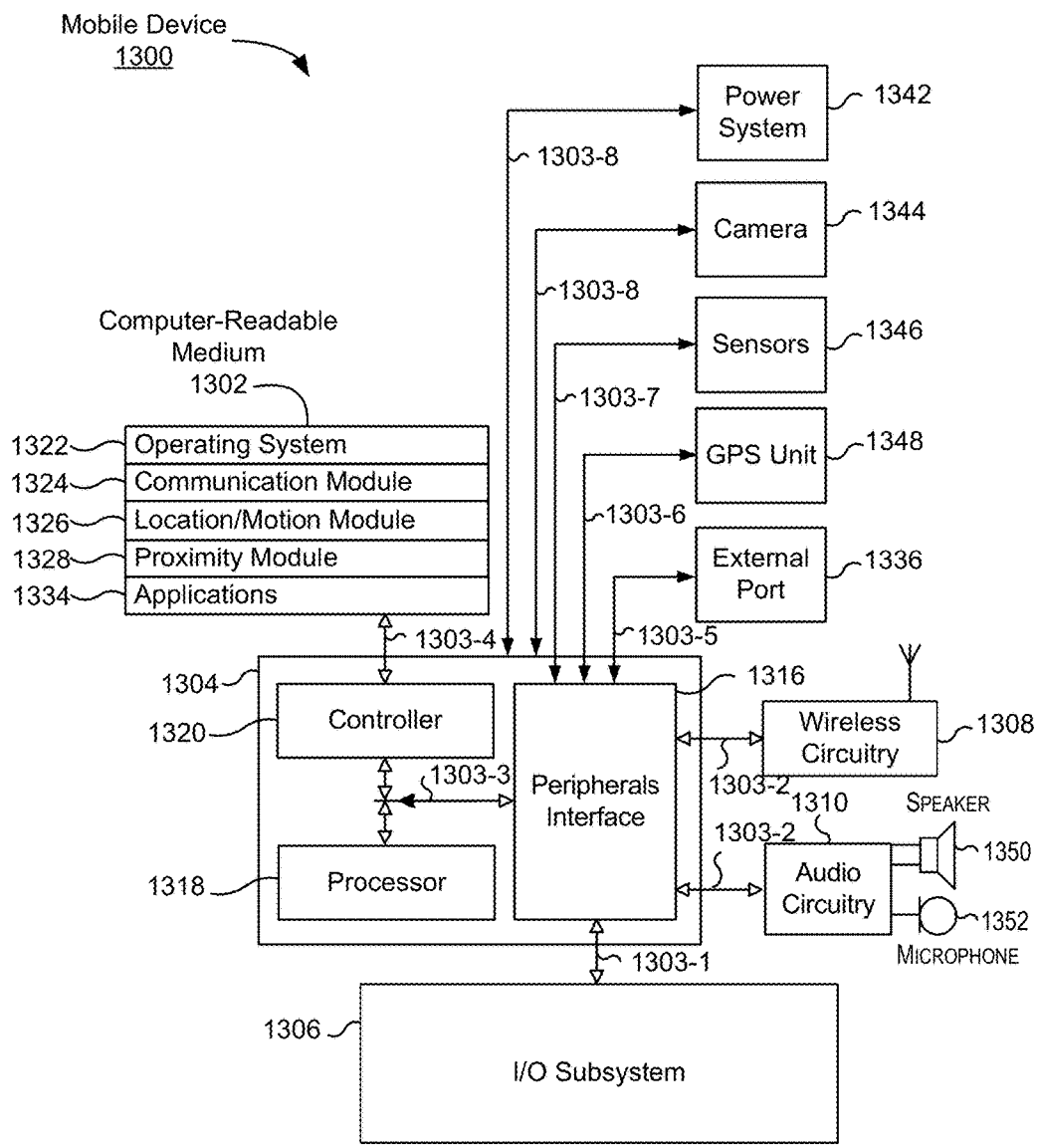
FIG. 13 is a block diagram of an example device 1300, which may be a mobile device

FIG. 13 is a block diagram of an example device 1300, which may be a mobile device. Device 1300 generally includes computer-readable medium 1302, a processing system 1304, an Input/Output (I/O) subsystem 1306, wireless circuitry 1308, and audio circuitry 1310 including speaker 1350 and microphone 1352. These components may be coupled by one or more communication buses or signal lines 1303. Device 1300 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 13 is only one example of an architecture for device 1300, and that device 1300 can have more or fewer components than shown, or a different configuration of components. The various components shown in FIG. 13 can be implemented in hardware, software, or a combination of both hardware and software, including one or more signal processing and/or application specific integrated circuits.

Wireless circuitry 1308 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1308 can use various protocols, e.g., as described herein.

Wireless circuitry 1308 is coupled to processing system 1304 via peripherals interface 1316. Interface 1316 can include conventional components for establishing and maintaining communication between peripherals and processing system 1304. Voice and data information received by wireless circuitry 1308 (e.g., in speech recognition or voice command applications) is sent to one or more processors 1318 via peripherals interface 1316. One or more processors 1318 are configurable to process various data formats for one or more application programs 1334 stored on medium 1302.

Peripherals interface 1316 couple the input and output peripherals of the device to processor 1318 and computer-readable medium 1302. One or more processors 1318 communicate with computer-readable medium 1302 via a controller 1320. Computer-readable medium 1302 can be any device or medium that can store code and/or data for use by one or more processors 1318. Medium 1302 can include a memory hierarchy, including cache, main memory and secondary memory.

Device 1300 also includes a power system 1342 for powering the various hardware components. Power system 1342 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1300 includes a camera 1344. In some embodiments, device 1300 includes sensors 1346. Sensors 1346 can include accelerometers, compasses, gyrometers, pressure sensors, audio sensors, light sensors, barometers, and the like. Sensors 1346 can be used to sense location aspects, such as auditory or light signatures of a location.

In some embodiments, device 1300 can include a GPS receiver, sometimes referred to as a GPS unit 1348. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1318 run various software components stored in medium 1302 to perform various functions for device 1300. In some embodiments, the software components include an operating system 1322, a communication module (or set of instructions) 1324, a location module (or set of instructions) 1326, a proximity module 1328 that determines whether another device is proximal, and other applications (or set of instructions) 1334.

Operating system 1322 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1324 facilitates communication with other devices over one or more external ports 1336 or via wireless circuitry 1308 and includes various software components for handling data received from wireless circuitry 1308 and/or external port 1336. External port 1336 (e.g., USB, FireWire, Lightning connector, 60-pin connector, etc.) is adapted for coupling directly to other devices or indirectly over a network (e.g., the Internet, wireless LAN, etc.).

Location/motion module 1326 can assist in determining the current position (e.g., coordinates or other geographic location identifiers) and motion of device 1300. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1326 receives data from GPS unit 1348 and analyzes the signals to determine the current position of the mobile device. In some embodiments, location/motion module 1326 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1308 and is passed to location/motion module 1326. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1300 based on the position coordinates of the corresponding transmitters. Regardless of the specific location technology used, location/motion module 1326 receives information from which a location fix can be derived, interprets that information, and returns location information, such as geographic coordinates, latitude/longitude, or other location fix data.

Proximity module 1328 can receive measurements from an antenna, e.g., connected to wireless circuitry 1308. The measurements can be used to determine whether the transmitting device is in a proximal state or a non-proximal state relative to mobile device 1300.

The one or more applications programs 1334 on the mobile device can include any applications installed on the device 1300, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1306 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1306 can include a display and user input devices such as a keyboard, mouse, and/or track pad. In some embodiments, I/O subsystem 1306 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1302) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1300 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the disclosure has been described with respect to specific embodiments, it will be appreciated that the disclosure is intended to cover all modifications and equivalents within the scope of the following claims.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" element does not necessarily require that a second element be provided. Moreover reference to a "first" or a "second" element does not limit the referenced element to a particular location unless expressly stated.

All patents, patent applications, publications, and descriptions mentioned herein are incorporated by reference in their entirety for all purposes. None is admitted to be prior art.

What is claimed is:

1. A method of electronically pairing an initiator device to a responder device, the method comprising performing, by the initiator device:
    performing one or more signal strength measurements of an advertisement signal from the responder device;
    determining a signal strength value using the one or more signal strength measurements;
    comparing the signal strength value to a threshold value, the threshold value determined by a human interaction model that discriminates between proximal states of the responder device and non-proximal states of the responder device, wherein the human interaction model is generated using other measurements of one or more other responder devices and one or more other initiator devices in a plurality of configurations; and
    initiating a pairing process between the responder device and the initiator device based on the comparing of the signal strength value to the threshold value.

2. The method of claim 1, further comprising:
    analyzing data in the advertisement signal to determine whether to perform the one or more signal strength measurements.

3. The method of claim 2, wherein analyzing the data in the advertisement signal includes:
    identifying a field in the advertisement signal that indicates that the responder device has not been previously been paired with another device.

4. The method of claim 1, wherein determining the signal strength value includes:
    determining an average or a median value of a plurality of signal strength measurements of the advertisement signal.

5. The method of claim 1, wherein a plurality of signal strength measurements are performed, and wherein determining the signal strength value includes:
    for each of the plurality of signal strength measurements:
        determining a proximal probability of the signal strength measurement corresponding to a user intent to initiate the pairing process by comparing the signal strength measurement to a proximal probability distribution, wherein the proximal probability distribution is generated using the other measurements of the one or more other responder devices and the one or more other initiator devices in a plurality of configurations; and
    using the proximal probabilities to determine the signal strength value.

6. The method of claim 5, further comprising:
    for each of the plurality of signal strength measurements:
        determining a non-proximal probability of the signal strength measurement corresponding to a user intent to not initiate the pairing process by comparing the signal strength measurement to a non-proximal probability distribution, wherein the non-proximal probability distribution is generated using the other measurements of the one or more other responder devices and the one or more other initiator devices in a plurality of configurations; and
    determining the signal strength value by comparing the proximal probabilities to the non-proximal probabilities.

7. The method of claim 1, further comprising:
    based on the comparing of the signal strength value to the threshold value, providing a confirmation option to a user for user input to confirm that the pairing process is to be initiated; and
    pairing the responder device and the initiator device in response to the user input.

8. The method of claim 1, further comprising:
    identifying a type of the responder device; and
    using the type to select the human interaction model from a plurality of human interaction models.

9. The method of claim 1, wherein the responder device and the initiator device are both mobile devices.

10. The method of claim 1, further comprising:
    sending a pairing request to the responder device;
    receiving a pairing response from the responder device;
    authenticating the responder device;
    exchanging one or more keys with the responder device;

ending a current communication session with the responder device; and at a later time, establishing a new communication session using the one or more keys, the new communication session being established without performing the pairing process.

11. The method of claim 1, wherein the responder device includes a plurality of sub-units.

12. A computer product comprising a non-transitory computer readable medium storing a plurality of instructions that when executed cause an initiator device to electronically pair with a responder device by:

performing one or more signal strength measurements of an advertisement signal from the responder device;

determining a signal strength value using the one or more signal strength measurements;

comparing the signal strength value to a threshold value, the threshold value determined by a human interaction model that discriminates between proximal states of the responder device and non-proximal states of the responder device, wherein the human interaction model is generated using other measurements of one or more other responder devices and one or more other initiator devices in a plurality of configurations; and initiating a pairing process between the responder device and the initiator device based on the comparing of the signal strength value to the threshold value.

13. The computer product of claim 12, wherein the instructions further cause the initiator device to perform:

analyzing data in the advertisement signal to determine whether to perform the one or more signal strength measurements, wherein analyzing the data in the advertisement signal includes:

identifying a field in the advertisement signal that indicates that the responder device has not been previously been paired with another device.

14. The computer product of claim 12, wherein a plurality of signal strength measurements are performed, and wherein determining the signal strength value includes:

for each of the plurality of signal strength measurements:
determining a proximal probability of the signal strength measurement corresponding to a user intent to initiate the pairing process by comparing the signal strength measurement to a proximal probability distribution, wherein the proximal probability distribution is generated using the other measurements of the one or more other responder devices and the one or more other initiator devices in a plurality of configurations; and using the proximal probabilities to determine the signal strength value.

15. The computer product of claim 12, wherein the instructions further cause the initiator device to perform:

based on the comparing of the signal strength value to the threshold value, providing a confirmation option to a user for user input to confirm that the pairing process is to be initiated; and pairing the responder device and the initiator device in response to the user input.

16. The computer product of claim 12, wherein the instructions further cause the initiator device to perform:

identifying a type of the responder device; and using the type to select the human interaction model from a plurality of human interaction models.

17. An initiator device for electronically pairing with a responder device, the initiator device including one or more processors configured to:

perform one or more signal strength measurements of an advertisement signal from the responder device;

determine a signal strength value using the one or more signal strength measurements;

compare the signal strength value to a threshold value, the threshold value determined by a human interaction model that discriminates between proximal states of the responder device and non-proximal states of the responder device, wherein the human interaction model is generated using other measurements of one or more other responder devices and one or more other initiator devices in a plurality of configurations; and initiate a pairing process between the responder device and the initiator device based on the comparing of the signal strength value to the threshold value.

18. The initiator device of claim 17, wherein the one or more processors are further configured to:

analyze data in the advertisement signal to determine whether to perform the one or more signal strength measurements, wherein analyzing the data in the advertisement signal includes:

identifying a field in the advertisement signal that indicates that the responder device has not been previously been paired with another device.

19. The initiator device of claim 17, wherein a plurality of signal strength measurements are performed, and wherein determining the signal strength value includes:

for each of the plurality of signal strength measurements:
determining a proximal probability of the signal strength measurement corresponding to a user intent to initiate the pairing process by comparing the signal strength measurement to a proximal probability distribution, wherein the proximal probability distribution is generated using the other measurements of the one or more other responder devices and the one or more other initiator devices in a plurality of configurations; and using the proximal probabilities to determine the signal strength value.

20. The initiator device of claim 17, wherein the one or more processors are further configured to:

based on the comparing of the signal strength value to the threshold value, provide a confirmation option to a user for user input to confirm that the pairing process is to be initiated; and pair the responder device and the initiator device in response to the user input.

21. The initiator device of claim 17, wherein the one or more processors are further configured to:

identify a type of the responder device; and use the type to select the human interaction model from a plurality of human interaction models.

* * * * *